Jan. 5, 1954    F. L. O. ROEHRIG    2,664,785
REARVIEW MIRROR

Filed Feb. 12, 1951    2 Sheets-Sheet 1

INVENTOR.
Frederick L. O. Roehrig.
BY
Wilfred J. Lawson
ATTORNEY.

Jan. 5, 1954   F. L. O. ROEHRIG   2,664,785
REARVIEW MIRROR
Filed Feb. 12, 1951   2 Sheets-Sheet 2

INVENTOR.
Frederick L. O. Roehrig.
BY
Wilfred E. Lawson
ATTORNEY.

Patented Jan. 5, 1954

2,664,785

UNITED STATES PATENT OFFICE 2,664,785

REARVIEW MIRROR

Frederick L. O. Roehrig, Yucaipa, Calif.

Application February 12, 1951, Serial No. 210,571

7 Claims. (Cl. 88—98)

This invention relates to automotive accessories and more especially to an adjustable rear view mirror.

An object of the invention is to provide novel improvements in an automotive rear view mirror having a plurality of aspects of adjustability.

Another object of the invention is to provide an adjustable rear view mirror for motor vehicles wherein the mirror may be more effectively retained in any of its adjusted positions.

An additional object of the invention is to provide a rear view mirror for motor vehicles having means for adjustment in a plurality of horizontal planes as well as vertically and wherein the operating means for effecting these adjustments is easily and readily actuated.

Another object of the invention is to provide a rear view mirror for automobiles having the usual features of angular adjustability and also having the focal length of the mirror adjustable.

Other objects and advantages will appear and be brought out more fully in the following specification, reference being had to the accompanying drawing.

Figure 1:
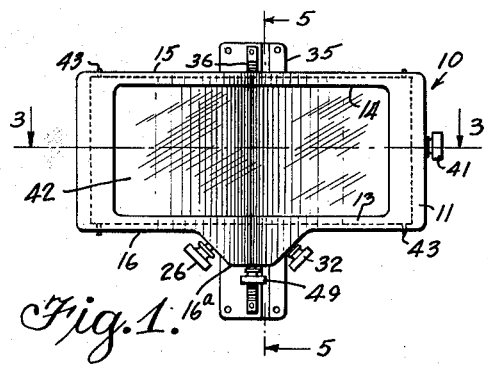
Figure 1 is an elevation view of an adjustable rear view mirror embodying the invention.
Figure 2:
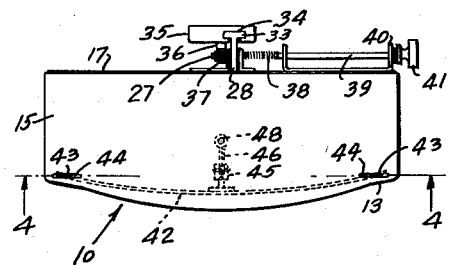
Figure 2 is a top plan view of the same.
Figure 6:
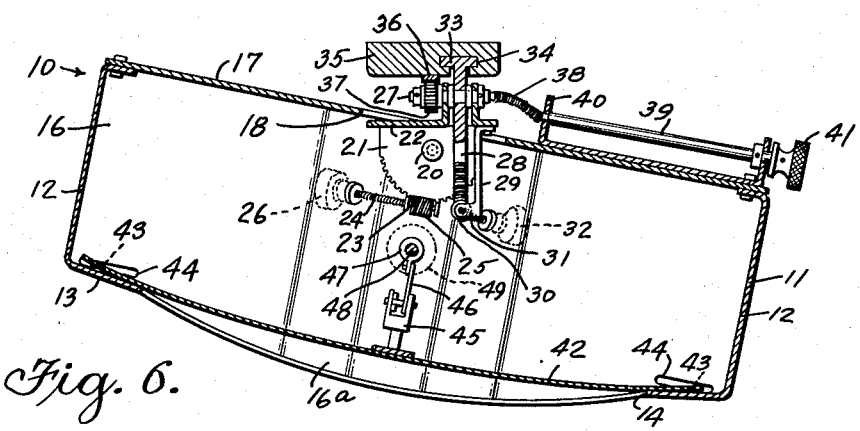
Figure 6 is a view similar to Figure 3 showing the mirror in an adjusted position.
Figure 7:
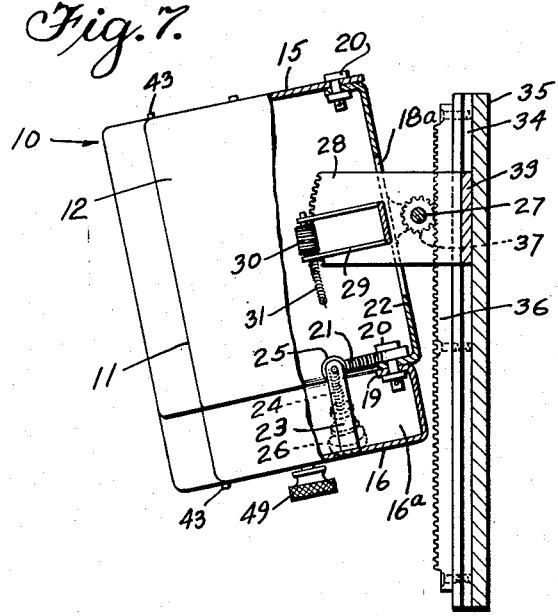
Figure 7 is a view similar to Figure 5 showing the mirror in another adjusted position.
Figure 8:
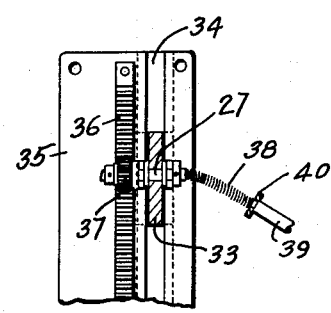
Figure 8 is a partial elevational view showing the mechanism for effecting elevational adjustment.
Figure 3:
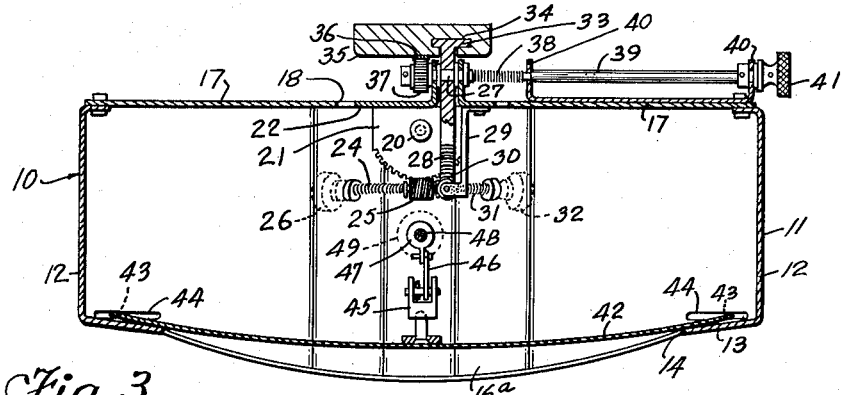
Figure 3 is an enlarged sectional view taken along the line 3—3 of Figure 1.
Figure 4:
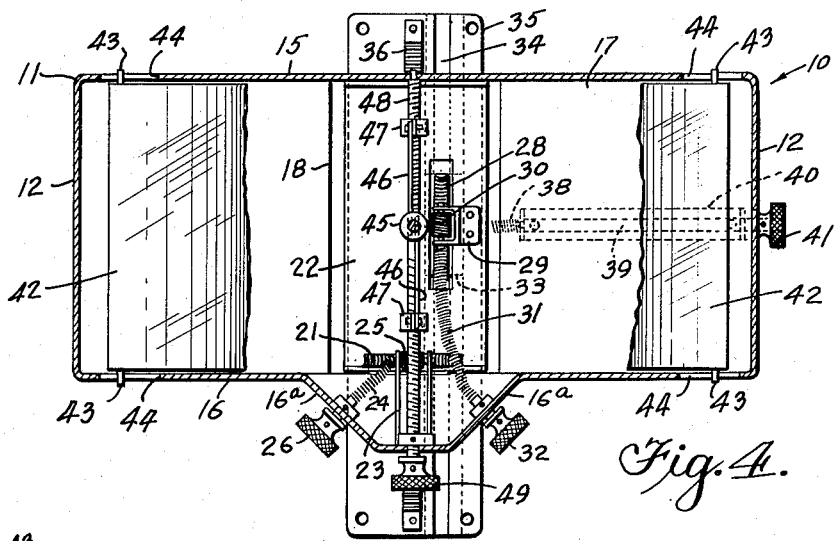
Figure 4 is an enlarged sectional view taken along the line 4—4 of Figure 2.
Figure 5:
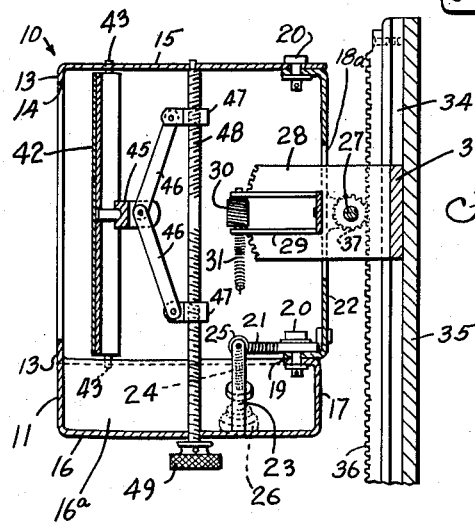
Figure 5 is an enlarged sectional view taken along the line 5—5 of Figure 1.

Referring more particularly to the drawing the numeral 10 indicates generally a rear view mirror structure embodying the invention and comprises a shell 11 of any suitable material but preferably of sheet metal having side walls 12, a front wall 13 formed with a rectangular opening 14, a top and bottom 15 and 16 respectively and a rear wall 17 which is formed with a central opening 18.

Wall 17 is formed with a flange 19 through which extends a bearing bolt 20 which also extends through a sector gear 21 secured to an elongate, upright bracket plate 22 which is positioned in the rear wall opening 18. A yoke 23 secured to bottom 16 provides a bearing for a flexible shaft 24, which carries a worm gear pinion 25, which meshes with sector gear 21, and has an operating knob 26, which extends through an inclined portion 16a of bottom wall 16. By this construction shell 11 is rotated about the axis of bearing pin 20 when shaft 24 is rotated.

Bracket 22 has a bearing mounting on a shaft 27, which extends through a sector plate 28 which extends forwardly into the shell through an opening 18a in the bracket plate 17. A bearing bracket 29 extends forwardly from bracket 22 and provides a bearing for a worm gear 30 which engages the teeth of sector plate 28, the gear 30 being secured to flexible shaft 31 which extends through bottom wall portion 16a and has an operating knob 32 at its outer end. By this construction shell 11 is rotated about the axis of shaft 27 when shaft 31 is rotated by the operation of knob 32.

Sector plate 28 has a T-shaped flange 33, which is slidable in a similarly shaped channel 34 in a mounting plate 35 which is adapted to be secured to the body or windshield frame of an automobile or motor vehicle. A rack 36 is carried by mounting plate 35 and a pinion 37 is secured on shaft 27 which is connected to the end of a flexible shaft 38 and meshes with the teeth of rack 36. Shaft 38 has a rod section 39 which is bearing mounted to a bracket 40 secured to wall 17 and has an operating knob 41.

By this construction when shaft 38—39 is rotated by actuation of knob 41, sector plate 28 will be raised or lowered thus raising or lowering the entire rear view mirror structure.

The numeral 42 indicates the mirror element which comprises a rectangular sheet of polished stainless steel or the equivalent and extends across opening 14 and has secured thereto pins 43 which extend through guide slots 44 in top and bottom walls 15 and 16 respectively. A yoke element 45 is suitably secured to the center of mirror 42 and connects one end of a pair of toggle links 46, the other ends of which links are connected to threaded collars 47 having threaded engagement on a reversely threaded shaft 48 which is bearing mounted to top and bottom walls 15 and 16 and has an operating knob 49. By this construction when shaft 48 is rotated the outer ends of toggle links 46 will be brought closer together or separated, thus flexing mirror 42 so that the focal length of the mirror will either be increased or decreased.

The operation of the invention should be clear from the foregoing description. The mirror shell 11 can be positioned in any adjusted position about the generally vertical axis of bearing bolt 20 by the rotation of shaft 24 and can be similarly positioned in any adjustable position by rotation about the horizontal axis of the bearing shaft 27 by rotation of shaft 31. Similarly the shell 11 can be elevated or lowered by actuation of shaft 38 which turns pinion 37 in its engagement with rack 36. Also the manipulation of shaft 48 will change the effective focal length of mirror 42 by flexing it into an arc of greater or less radius.

While in the foregoing there has been shown and described the preferred form of this invention, it is to be understood that minor changes in the details of construction, combination and arrangement of parts may be resorted to without departing from the spirit and scope of the invention as claimed.

I claim:

1. A rear view mirror comprising, in combination, a shell including a front wall and a back wall, the front wall having a frame opening, a mirror of resilient material mounted in said frame opening, means slidably coupling the mirror adjacent to opposite edges with the shell whereby said edges may move toward and away from each other upon transverse bending of the mirror between said edges, means connected with said back wall for turning the shell in each of two perpendicularly related planes, and manually operable means within the shell and coupled with the rear wall of the mirror for selectively applying thrust or pull thereto to effect the said bending thereof.

2. The invention according to claim 1, wherein said manually operable means comprises a double threaded shaft rotatably supported in the shell, a pair of toggle arms pivotally coupled together at one end and to the mirror, a pair of collars threaded on said shaft, each collar having the other end of one arm pivotally connected thereto, and means for turning the shaft.

3. A rear view mirror comprising, in combination, a shell including a front wall and a back wall, the front wall having a frame opening, a mirror of resilient material mounted in said frame opening, means within the shell and coupled with the rear side of the mirror for flexing the mirror to change the focal length thereof, said back wall having an opening therein, a bracket plate within the last named opening and pivotally coupled to the back wall for the turning of the shell thereon on an axis passing through the top and bottom of the shell, means pivotally supporting said bracket plate for turning on an axis perpendicular to the first axis, and separate means for effecting the turning of the shell on the first axis and for turning the shell and bracket plate on the second axis.

4. The invention according to claim 3, wherein the said means pivotally supporting the bracket plate comprises an elongate gear plate secured at one end and extending substantially horizontally into the shell through an opening in the bracket plate, the gear plate having gear teeth at the end thereof within the shell, a pivot member passing transversely through the gear plate on the outer side of the shell and having the bracket plate pivotally supported thereon to turn on the second mentioned axis, a worm supported by the bracket plate and having threaded connection with the gear plate teeth, and means operatively connected with the worm for turning the latter from a position outside the shell.

5. A rear view mirror comprising, in combination, a shell including a front wall having a frame opening, a back wall having a bracket plate opening, top, bottom and end walls, a mirror mounted in the frame opening, an elongate bracket plate in said bracket plate opening, pivot means coupling the top and bottom portions of the bracket plate with the shell for the turning of the shell on an axis passing through the top and bottom thereof, said bracket plate having a gear plate opening therein, a support body disposed at the back of the shell across the bracket plate opening, an elongate gear plate attached at one end to said body and extending through said gear plate opening, a shaft extending through and supported by the gear plate and supporting the bracket plate for turning movement thereon, gear teeth carried upon the inner end of the gear plate, a rotary worm gear in toothed connection with said gear teeth, means supporting the worm gear from the bracket plate, means operative from outside the shell and coupled with the worm gear to rotate the latter, and means for effecting turning of the shell on the said pivot means.

6. The invention as set forth in claim 5, wherein the last stated means comprises a gear sector secured to one of the said pivot means, a rotary worm gear in toothed connection with said gear plate, means supporting the last named worm gear from the shell body, and means operative from outside the shell body for turning the last named worm gear.

7. The invention as set forth in claim 5, wherein the attachment between the gear plate and the support body comprises a sliding connection facilitating movement of the gear plate vertically on the body, a vertical toothed rack secured to the body parallel to the line of movement of the gear plate thereon, a gear secured to said shaft and in toothed connection with said rack, and means facilitating the rotation of the shaft and gear.

FREDERICK L. O. ROEHRIG.

References Cited in the file of this patent

UNITED STATES PATENTS

| Number | Name | Date |
| --- | --- | --- |
| 1,823,636 | Winkler et al. | Sept. 15, 1931 |
| 1,910,119 | Moats | May 23, 1933 |
| 2,325,615 | La Hodny et al. | Aug. 3, 1943 |
| 2,504,386 | Brady et al. | Apr. 18, 1950 |
| 2,504,387 | Pruellage | Apr. 18, 1950 |